US012597323B2

(12) United States Patent
Thibault et al.

(10) Patent No.: US 12,597,323 B2
(45) Date of Patent: Apr. 7, 2026

(54) METHOD, SYSTEM AND APPARATUS FOR CONTROLLING SECURITY SIRENS OF A SECURITY SYSTEM

(71) Applicant: Universal Electronics Inc., Scottsdale, AZ (US)

(72) Inventors: Thomas Thibault, Carlsbad, CA (US); Michael Bailey, San Marcos, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 44 days.

(21) Appl. No.: 18/609,861

(22) Filed: Mar. 19, 2024

(65) Prior Publication Data

US 2025/0299541 A1     Sep. 25, 2025

(51) Int. Cl.
| | |
|---|---|
| *G08B 3/10* | (2006.01) |
| *G06F 3/16* | (2006.01) |
| *G08B 25/10* | (2006.01) |

(52) U.S. Cl.
CPC .............. *G08B 3/10* (2013.01); *G06F 3/165* (2013.01); *G08B 25/10* (2013.01)

(58) Field of Classification Search
CPC ............ G08B 3/10; G08B 25/10; G06F 3/165
See application file for complete search history.

(56) References Cited

U.S. PATENT DOCUMENTS

| | | | | | |
|---|---|---|---|---|---|
| 6,005,478 | A | * | 12/1999 | Boreham ................. | G08B 3/10 340/426.22 |
| 6,288,639 | B1 | * | 9/2001 | Addy .................... | H04L 27/066 340/505 |
| 6,856,242 | B2 | * | 2/2005 | Trent ....................... | G08B 3/10 340/384.1 |
| 7,479,893 | B2 | * | 1/2009 | Weston .................... | G08B 3/10 340/7.52 |
| 11,647,849 | B2 | * | 5/2023 | Horvath ................. | A47F 10/02 49/14 |
| 12,248,733 | B1 | * | 3/2025 | Walker ............. | G08B 13/19678 |
| 12,394,285 | B2 | * | 8/2025 | Muhsin .................... | H04R 3/00 |
| 2002/0085045 | A1 | * | 7/2002 | Vong ..................... | G06F 3/0481 715/840 |
| 2005/0125083 | A1 | * | 6/2005 | Kiko ..................... | H04L 12/282 700/20 |
| 2005/0253706 | A1 | * | 11/2005 | Spoltore .............. | G08B 25/009 340/541 |

* cited by examiner

*Primary Examiner* — John A Tweel, Jr.
(74) *Attorney, Agent, or Firm* — Greenberg Traurig, LLP

(57) ABSTRACT

Described is a method, apparatus and system for controlling one or more security sirens of a security system. A security system controller receives alarm signals from security sensors of the security system. In response, the security system controller determines one or more conditions related to the security system and then generates one or more siren control signals that are used to control audible alerts generated by one or more of the security sirens.

6 Claims, 5 Drawing Sheets

400

Install/Configure Security System Controller

402

Enter Particular Mode of Operation

404

Receive Alarm Signal

406

Determine Existing Conditions

408

Generate Siren Control Signal(s)

410

Transmit Siren Control Signal(s)

500

Install Security Sensor(s)

502

Alarm Signal Received by Security Controller

504

Determine Condition(s)

506

Generate/Transmit Siren Control Signal

508

Siren Control Signal Received

510

Determine Manner in Which to Sound Alert

512

Determine Person Present

514

Generate Control Signal to Sound Alert

METHOD, SYSTEM AND APPARATUS FOR CONTROLLING SECURITY SIRENS OF A SECURITY SYSTEM

BACKGROUND

I. Field of the Invention

The present invention relates to home security and, more particularly, to various improvements in controlling security sirens of a home security system.

II. Description of Related Art

Home security systems are very popular in the United States and abroad. Such home security systems typically comprise a security panel or controller located inside a home or business and a number of sensors distributed around the home or business to detect unauthorized entry and/or movement inside. For example, a home may have all of its doors and windows monitored by wireless door/window sensors affixed onto each door and window to detect unauthorized entry, and one or more motion sensors installed at one or more points for detecting unauthorized movement inside. Each of the sensors may transmit a wireless alarm signal to the security panel when a sensor is triggered, where the security panel may take one or more actions in response, such as to sound a security siren inside the home or contacting a remote monitoring facility.

Security sirens have long been used in security systems to produce a very loud sound when the security system is triggered by unauthorized entry. Such security sirens typically sound at a fixed, loud volume, such as 120 dB and may comprise one of a variety of sound types, such as a warble, a frequency that varies with time, a recording of a human voice, etc. The intent of using a very loud siren is to scare intruders off and to alert persons inside as well as outside a home or business that an unauthorized entry has occurred.

There are several drawbacks of prior art security sirens. While sirens are designed to be very loud in order to frighten would-be burglars, they can be jolting and disruptive to owner occupants when the security system is triggered inadvertently. Homeowners often choose to stop using their security system and stop paying any monthly monitoring fees if such loud disruptions occur too frequently.

Another drawback of prior art security sirens is that they typically sound at a fixed volume no matter how many sirens are present and no matter where or when an unauthorized entry occurs.

Yet another drawback of prior art security sirens is that outdoor sirens are often triggered along with any indoor sirens in the event of a false alarm condition. This may be especially true in the first few months of installation of a security system, as more false alarms may occur due to unfamiliarity with the system by various household members. Each time a false alarm occurs, not only are indoor occupants jolted by the loud indoor sirens, but typically many homes in a neighborhood will experience the piercing sound of a security siren during false alarm situations due to the outdoor siren(s).

It would be desirable to allow security sirens some flexibility in their operation to minimize or eliminate the aforementioned drawbacks.

SUMMARY

Various embodiments of a system, method and apparatus for controlling one or more security sirens of a security system is disclosed. In one embodiment, a security system controller is described, comprising a first communication interface for wirelessly receiving information from a security sensor and a wirelessly transmitting a siren control signal to a security siren, a non-transitory memory for storing processor-executable instructions, and a processor, coupled to the first communication interface and the non-transitory memory for executing the processor-executable instructions that causes the processor to receive, via the first communication interface, an alarm signal from the security sensor, generate the siren control signal based on one or more conditions related to the security system, and transmit the siren control signal to the security siren.

In another embodiment, a method, performed by a security system controller, is described, comprising receiving an alarm signal from a security sensor of the security system, generating a siren control signal for controlling operation of a security siren of the security system based on one or more conditions related to the security system and transmitting the siren control signal to the security siren.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION

This disclosure describes various embodiments of an apparatus, system and method for controlling one or more security sirens in a security system. When a security system is triggered, one or more security sirens are controlled based on one or more conditions associated with the security system. For example, when it is late at night, a security system controller may cause any and all security sirens to sound at their maximum volume but during the daytime, may cause one or more of the security sirens to sound at a lower volume. In another example, when a security system is triggered, a security system controller may determine how long the security system has been installed and cause one or more security sirens to sound at a reduced volume if the security system has been recently installed. This may help minimize the distress of a very loud siren blaring when false alarms occur, which are much more common in the first few months of having a security system installed.

Figure 1:
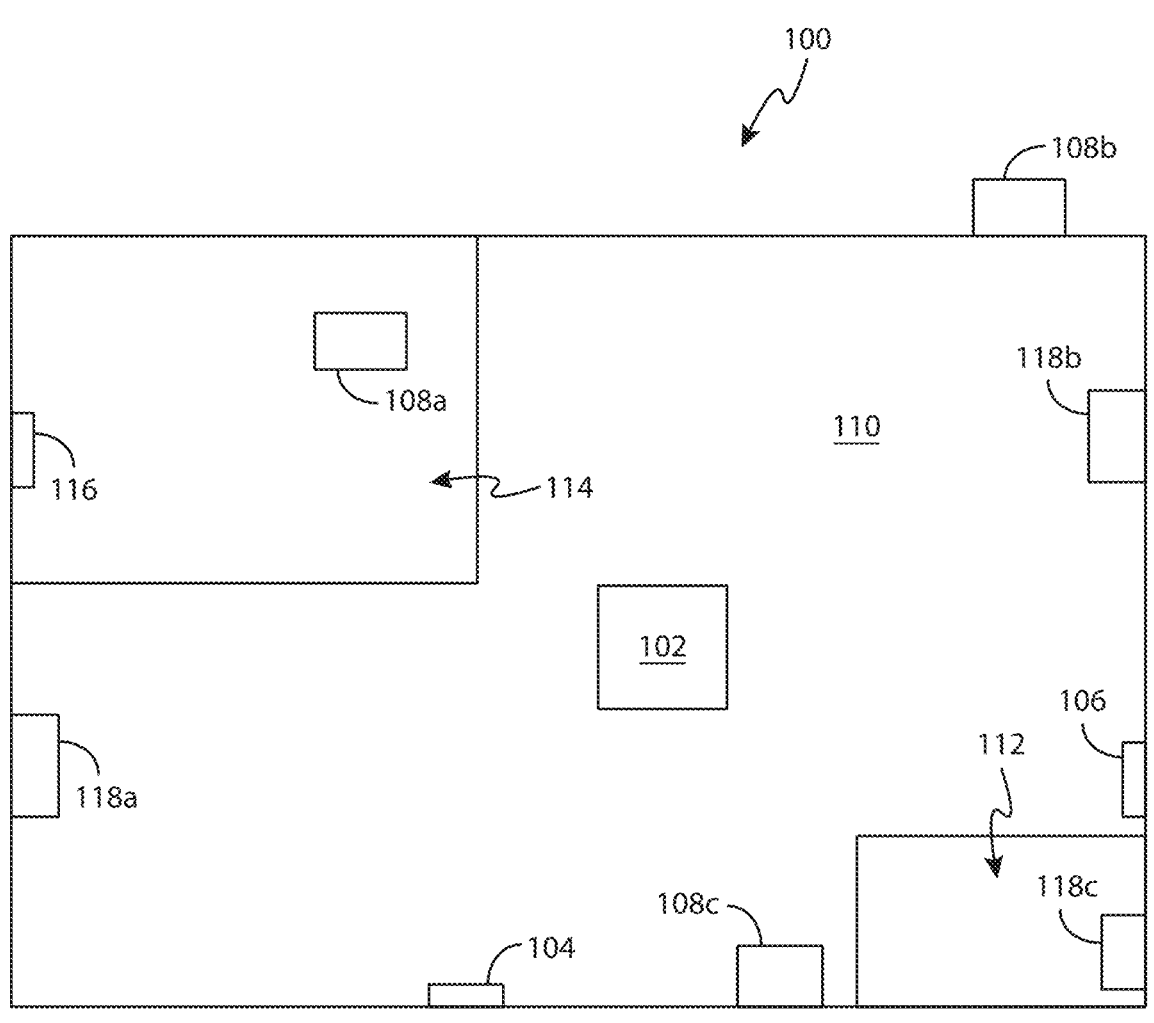
FIG. 1 is a functional block diagram of a structure comprising a security system in accordance with the teachings herein.

FIG. 1 illustrates a block diagram of a structure 100, such as a home or office, monitored by a security system comprising a security system controller 102, two or more security sensors 104, 106 and 116, one or more security sirens 108a, 108b and 108c and one or more motion/occupancy sensors 118a, 118b and 118c. Structure 100 comprises, in this example, a main living area 110, a bedroom 112 and a garage 114.

Security sensor 104 comprises, in this example, a door sensor that monitors a door, security sensor 106 comprises a window sensor for monitoring a window and tilt sensor 116 monitors a garage door. Each of the security sensors are standard, wireless sensors commonly used in home and business security systems. Security system controller 102 comprises a security panel, home automation hub or gateway that receives wireless alarm signals from the security sensors and initiates one or more actions when the security system is in an armed state. For example, security system controller 102 may cause one or more of the security sirens to sound. However, security system controller 102 may be configured to control one or more of the security sirens differently than in traditional security systems, as will be explained in greater detail later herein.

Each of the security sirens comprises at least a wireless receiver, amplification circuitry and a speaker for receiving siren control signals from security system controller 102 and for causing an audible alert to sound from the speaker. In some embodiments, the siren control signal comprises instructions for each siren to sound in a particular manner. For example, a first siren control signal may comprise instructions that causes security siren 108c to sound at a first, maximum volume level when the security system is triggered, and causes security siren 108b to sound at a different, softer volume level, or to ramp the volume level from a relatively low volume level to a maximum volume level over time, such as 30 seconds. In other embodiments, one or more security sirens in the security system are configured to make their own determinations as to how to sound a siren when they receive a siren control signal from security system controller 102. In this embodiment, a security siren may determine how to sound a siren based on conditions of the security system and/or other factors. For example, a security siren may receive an indication from security system controller 102 that the security system is in an armed-home mode of operation, where the security system is triggered only by door, window or tilt sensors and not by any motion detectors. The security siren may also be pre-programmed with information indicating a location where the security siren is installed. At some time later, the security siren may receive a siren control signal from security system controller 102, indicating that an unauthorized entry has occurred. In response, the security siren may consider the security system mode of operation, its installed location and the time of day and/or day of the week when the activation signal is received to determine how to sound an audible alert from its speaker. For example, if the security siren receives a siren control signal from security system controller 102 between 11 PM and 6 AM on any day, the security siren may generate a siren at a maximum volume level. However, if a siren control signal is received during daylight hours, the security siren may generate a siren at either a soft or moderate volume level, or ramp the siren volume from a soft or moderate volume level to its maximum volume capability. In another example, if the security siren receives information from security system controller 102 that the security system is in an armed-away mode of operation, i.e., where triggering any security sensor in the system will cause a siren control signal to be transmitted by security system controller 102, when the security siren receives a siren control signal, it may cause a siren to be emitted from its speaker at a maximum volume level. In yet another example, the security siren may be configured to sound a moderate-volume siren when it receives a siren control signal late at night from security system controller 102 when the security siren is located near a bedroom. In general, a security siren may be programmed to alter an emitted audio alert based on a state of the security system, the time of day and/or day of the week that a siren control signal is received, a location of a security siren, a location of a security sensor that transmitted an alarm signal, as well as other attributes or conditions associated with the security system.

In another embodiment, one or more of the security sirens of the security system security system controller 102 do not have a capability of self-determining in what manner to sound a siren. In this embodiment, security system controller 102 determines how each siren in the security system will sound when a triggering event occurs. For example, security system controller 102 may be pre-programmed with the location of each security siren in the security system, the type and location of each security sensor, and a date that the security system was installed or otherwise initiated. When security system controller 102 receives a wireless alarm signal from one of the security sensors, security system controller 102 may make a determination on how each security siren should sound as a result of receiving the wireless alarm signal. For example, if the security system is in an armed-home mode of operation and the security system controller 102 receives a wireless alarm signal from one of the security sensors at 1 AM, security system controller 102 may transmit a siren control signal to security siren 108a, located in garage 114, to sound at a maximum volume level, while sending a siren control signal to security siren 108c, located near bedroom 112, to sound at a moderate volume level in order to avoid jarring anyone asleep in bedroom 112. If the security system was in an armed-away mode of operation when the alarm signal was received, the security system controller 102 may cause each and every siren of the security system to emit an audible alert at a maximum level. In another example, when an alarm signal is received from a security sensor, security system controller 102 may determine a location of the security sensor that transmitted the alarm signal, and in response, transmit one or more siren control signals to one or more security sirens based on which security sensor transmitted the alarm signal. For example, if tilt sensor 116 is triggered, security system controller 102 may transmit one or more siren control signals to the security sirens, instructing each siren to sound at a maximum volume level. However, if the alarm signal originated from door sensor 104, security system controller 102 may transmit a siren control signal to security siren 108c with instructions to sound at a moderate volume level, due to security siren 108c being located near a bedroom and send one or more other siren control signals to each of the other security sirens, with instructions for each security siren to sound at a maximum volume level.

In some embodiments, one or more security sirens may be configured to provide an audible warning to occupants that a siren will sound imminently, as a result of the security system being triggered. When the security system is triggered, in one embodiment, only some of the security sirens may provide such an audible warning, depending on one or more attributes or conditions of the security system, or other factors, such as time of day, location of a security siren, location of the origin of an alarm signal, time of day, day of week, etc.

Motion/occupancy sensor 118a, 118b and 118c comprise standard motion sensors, such as PIR detectors, movement-triggered occupancy detectors, or the like, commonly used in security systems and home automation systems. When motion and/or occupancy is detected, the sensors transmit an activity signal to security system controller 102 (and/or a home automation controller, not shown), and security system controller 102 may determine a manner in which to generate and transmit one or more siren control signals based on the activity signal.

Security system controller 102 comprises a security panel, gateway or hub for receiving alarm signals from the security sensors and for generating and transmitting siren control signals. In one embodiment, system security controller 102 comprises a self-contained, electronic device located in a home or business. In other embodiments, system security controller 102 comprises a hub or gateway that connects to a remote computer server via a wide-area network, such as the Internet. In these cases, the remote server may process alarm signals received by the gateway or hub and forwarded to the remote server, and the remote server may make determinations on how to control one or more security sirens in the security system.

Figure 2:
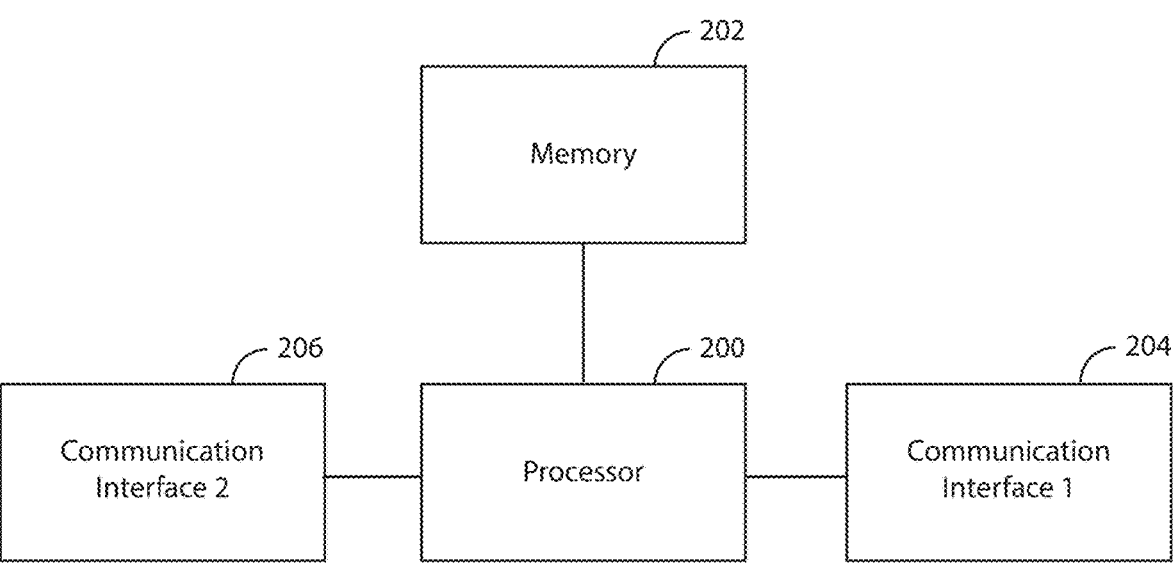
FIG. 2 is a functional block diagram of one embodiment of a security system controller as shown in FIG. 1.

FIG. 2 is a functional block diagram of one embodiment of security system controller 102. In this embodiment, security system controller 102 comprises a processor 200, a memory 202, a first communication interface 204, and a second communication interface 206. It should be understood that the functional blocks may be connected to one another in a variety of ways, and that not all functional blocks necessary for operation of security system controller 102 are shown, for purposes of clarity, such as a power supply, user interface, etc.

Processor 200 is configured to provide general operation of security system controller 102 by executing processor-executable instructions stored in memory 202, for example, executable code. Processor 200 typically comprises a general-purpose processor, such as a Quad-core 64-bit 1.9 GHZ ARM CPU, although any one of a variety of microprocessors, microcomputers, microcontrollers, and/or custom ASICs may be used, selected based on cost, computing power, features and/or other factors. Once memory 202 is loaded with the processor-executable instructions, processor 200 becomes a specialized processor for performing the inventive concepts described herein.

Memory 202 is coupled to processor 200 and comprises one or more non-transitory, information storage devices, such as RAM, ROM, flash memory, or virtually any other type of electronic, optical, or mechanical information storage device. Memory 202 is used to store the processor-executable instructions for operation of security system controller 102 as well as any information used by processor 200, a current time of day, day of week, a type and location of each security sensor and security siren in the security system, user preferences, representations of one or more sirens, a date of security system installation or initiation, etc. Memory 202 could, alternatively or in addition, be part of processor 200, as in the case of a microcontroller comprising on-board memory.

First communication interface 204 is coupled to processor 200 and comprises circuitry necessary to transmit and receive wireless signals between security system controller 102 and the security sensors and security sirens. Such circuitry is well known in the art and may comprise Bluetooth, Wi-Fi, Zwave, Zigbee, X-10, RF, Matter, Thread, or Lora circuitry, among others.

Second communication interface 206 is coupled to processor 200 and comprises circuitry necessary to communicate with a remote entity, such as a remote computer server, a remote monitoring station, a user's mobile phone, etc., over a wide-area network, such as the Internet. Such circuitry is well known in the art, typically comprising ethernet and/or Wi-Fi communication circuitry.

Figure 3:
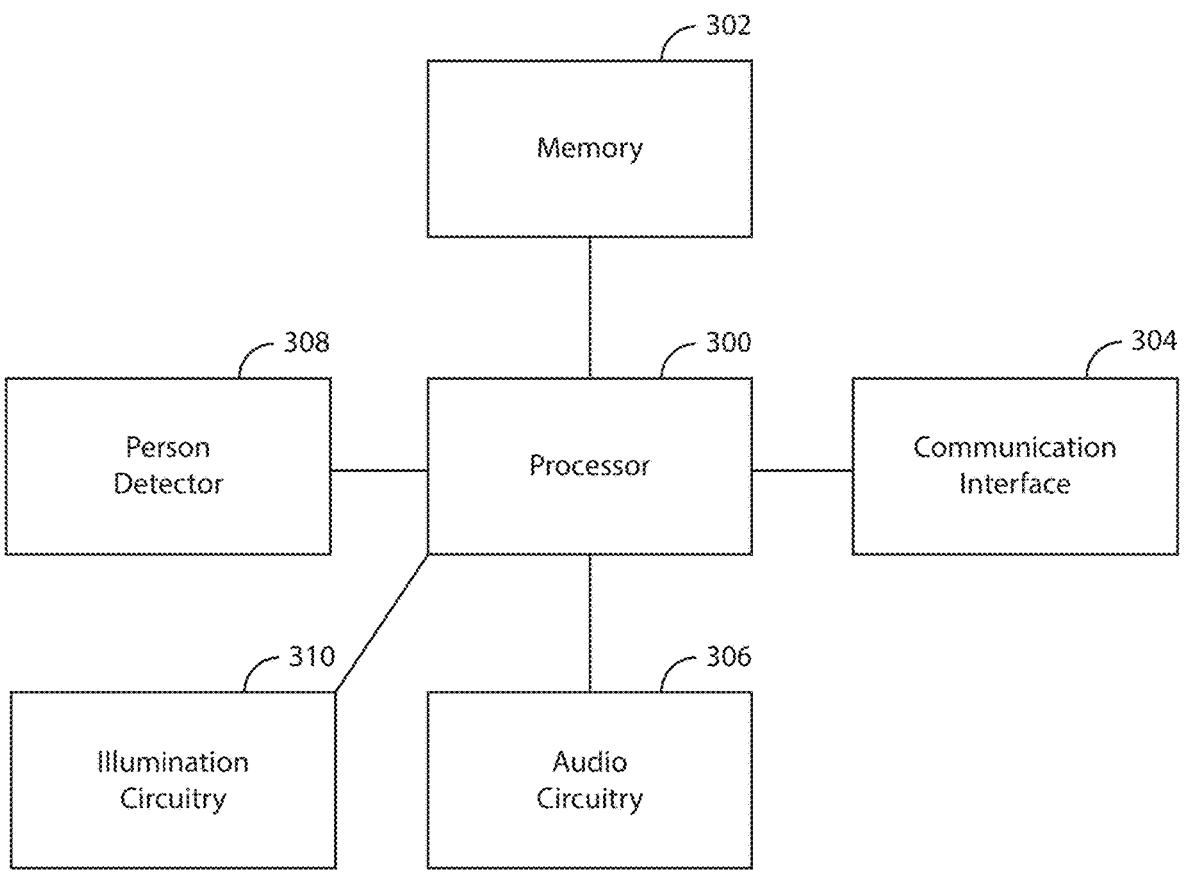
FIG. 3 is a functional block diagram of one embodiment of a security siren as shown in FIG. 1 configured for operation in accordance with the inventive teachings herein.

FIG. 3 is a functional block diagram of one embodiment of security siren 108a, 108b or 108c configured for operation in accordance with the inventive teachings herein. Specifically, FIG. 3 shows processor 300, memory 302, communication interface 304, audio circuitry 306 and optional illumination circuitry 310. It should be understood that the functional blocks may be coupled to one another in a variety of ways, and that not all functional blocks necessary for operation of the barrier alarm device are shown (such as a power supply), for purposes of clarity.

Processor 300 is configured to provide general operation of security siren by executing processor-executable instructions stored in memory 302, for example, executable code. Processor 300 typically comprises a general-purpose processor, such as an ADuC7024 analog microcontroller manufactured by Analog Devices, Inc. of Norwood Massachusetts, although any one of a variety of microprocessors, microcomputers, and/or microcontrollers may be used alternatively. Processor 300 is selected based on cost, computing power, features and/or other factors. Once memory 302 is loaded with the processor-executable instructions, processor 300 becomes a specialized processor for performing the inventive concepts described herein.

Memory 302 comprises one or more non-transitory information storage devices, such as RAM, ROM, flash, or other type of electronic, optical, or mechanical memory device. Memory 302 is used to store processor-executable instructions for operation of the barrier alarm device as well as any information used by processor 300, such as one or more digital files each representing a particular siren sound, an installation location of the security siren, a current time of day, a current day of the week, a date that the security sensor was installed or initially used with the security system, etc.

Communication interface 304 is coupled to processor 300, comprising circuitry necessary to wirelessly communicate with security system controller 102. In some embodiments, communication interface 304 comprises only a wireless receiver in an embodiment where the security siren is not capable of transmitting information, while in other embodiments, communication interface 304 comprises both a receiver and a transmitter, i.e., a transceiver, for sending and receiving wireless information to/from security system controller 102. Such circuitry is well known in the art and may comprise Bluetooth, Wi-Fi, RF, Zwave, Zigbee, Matter, Thread, and Lora, among others.

Audio circuitry 306 is coupled to processor 300, comprising circuitry necessary to emit audible alerts to users within structure 100, such emits an audible alert, such as a siren, a human-simulated voice alert, or other loud sound(s), intended to aid alert occupants of a potential unauthorized entry and to frighten would-be intruders from entering structure 100. Audio circuitry 306 typically comprises an amplifier to amplify a siren signal from processor 300 and a loudspeaker for emitting the audible alert at one or more volume levels with a maximum volume level typically of 120 decibels or more. The siren signal from processor 200 may comprise a signal for producing a variety of siren sounds, such as a warble sound, a frequency that varies with time, a recording of a human voice, a non-varying tone, etc.

Person detector 308 is coupled to processor 300, comprising a motion detector and/or an occupancy sensor. Such sensors are well-known in the art and may comprise PIR sensor, an ultrasonic transceiver, a camera, etc., a microphone, amplification circuitry and associated firmware stored in memory 302 that may detect human voices or other sounds associated with human activity or presence, or a combination thereof. When motion and/or occupancy is sensed by person detector 308, it sends one or more signals to processor 300 in order to report that a person may be in proximity to a security siren.

Illumination circuitry 310 is coupled to processor 300, comprising a light source and associated circuitry to cause the light source to emit one or more types of light as a visual warning to occupants of structure 100 that an alarm signal was transmitted by one of the security sensors. Illumination circuitry 310 typically comprises a strobe light, comprising one or more light-emitting diodes or other common lighting device, that flashes an intense light, intended to frighten away would-be intruders. However, other types of light may be emitted, such as a continuously-on light, a varying brightness light, etc.

Figure 4:
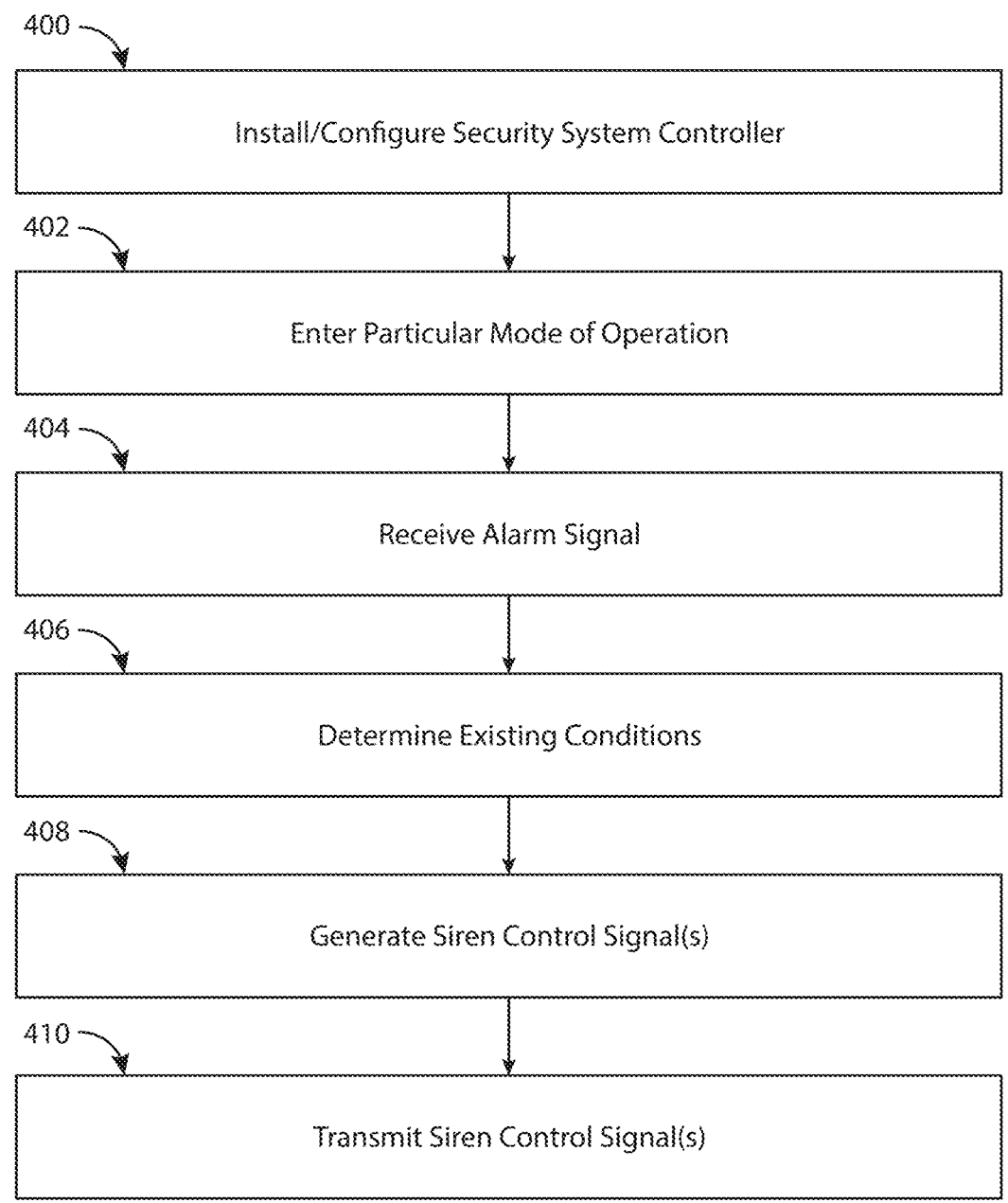
FIG. 4 is a flow diagram illustrating one embodiment of method, or algorithm, performed by the security system controller as shown in FIGS. 1 and 2, for managing one or more of the security sirens in the security system as shown in FIG. 1.

FIG. 4 is a flow diagram illustrating one embodiment of method, or algorithm, performed by security system controller 102 for controlling one or more security sirens in a security system. It should be understood that in some embodiments, not all of the steps shown in FIG. 4 are performed and that the order in which the steps are carried out may be different in other embodiments. It should be further understood that some minor method steps have been omitted for purposes of clarity.

The process begins at block 400, where security system controller 102 is installed into a home or business location, such as structure 100. As part of the installation process, security system controller 102 is typically provisioned with the current time and date, an identification of a plurality of security sensors that monitor structure 100, and one or more of the following: location information where one or more of the security sensors are mounted, an identification of one or more security sirens used by the security system, and location information where one or more of the security sirens are mounted.

At block 402, the security system is placed into a particular mode of operation by a user. For example, the security system may be placed into an armed-home mode, an armed-away mode or an off mode. In the armed-home mode of operation, security system controller 102 responds to alarm signals transmitted by perimeter sensors, such as door sensors, window sensors and tilt sensors while ignoring alarm signals from motion detectors. In the armed-away mode of operation, security system controller 102 responds to alarm signals transmitted by any security sensor in the security system. In the off mode of operation, security system controller 102 does not respond to any alarm signals transmitted by any security sensor. Placement into one of the operating modes is typically done by entering information into a user interface on a security keypad or smart phone app.

At block 404, processor 200 of security system controller 102 receives an alarm signal via communication interface 204, the alarm signal transmitted by one of the security sensors after a door, a window or a garage door is opened, or when motion is detected by a motion sensor.

At block 406, processor 200 evaluates the alarm signal and determines one or more conditions relating to the security system, such as a current mode of operation, an identification of which security sensor sent the alarm signal, a time of day that the alarm signal was received, a number and location of each security siren in the security system, a length of time that the security system has been installed, etc.

At block 408, processor 200 generates one or more siren control signals based on the one or more conditions. For example, processor 200 may determine an installed location of the security sensor that transmitted the alarm signal. For example, if the alarm signal identified door sensor 104 as the security sensor that transmitted the alarm signal, then processor 200 may retrieve from memory 202 a location where door sensor 104 has been installed, based on an identification of door sensor 104 and location information that was stored in memory 202 earlier. Continuing with the previous example, processor 200 may determine from information stored in memory 202 that door sensor 104 is located in the main living area 110.

In another example, if the security system is operating in an armed-away mode of operation, and the alarm signal was received from a door, window or tilt sensor at any time of day or day of the week, processor 200 may generate a single siren control signal that is sent to all of the security sirens in the security system. The single siren control signal may comprise instructions that causes each security siren to emit a particular audible alert, such as a warble siren, at a maximum volume level. When each security siren receives the siren control signal, each security siren emits the particular audible alert at the maximum volume level.

In some embodiments, the siren control signal may comprise instructions that causes one or more security sirens to sound a particular type of siren. Generally, a variety of security siren types may be available to processor 200, as stored in memory 202, such as a warble siren sound, a continuous audible tone, a simulated human voice warning about an intrusion, a variable-frequency siren, etc. An indication may be stored in memory 202 as to which security siren is to sound a particular audible type when an alarm signal is received, or one or more audible types and volumes depending on conditions associated with the security system.

In another example, in addition to the above example, if the security system is operating in an armed-home mode of operation, and the alarm signal was received from a door, window or tilt sensor within a first predesignated time period, such as between the hours of 11 PM and 5 AM at any time of day or day of the week, processor 200 may compare the time of day that the alarm signal was received with one or more time periods stored in memory 202. When the alarm signal is received during a particular time period, such as between 11 PM and 5 AM, processor 200 may generate a single siren control signal that is sent to all of the security sirens in the security system. The single siren control signal comprises instructions that cause each security siren to emit an audible alert at a maximum volume level. When each security siren receives the siren control signal, each security siren emits the audible alert at the maximum volume level. However, if the alarm signal was received within a second predesignated time period, such as between the hours of 5 AM and 11 PM, processor 200 may generate a single siren control signal that is sent to all of the security sirens in the security system, comprising instructions that cause each security siren to emit an audible alert at a volume level less than the maximum volume level. In another embodiment, the siren control signal may comprise instructions for each sensor to ramp a siren volume from a low or medium volume level to a high or volume maximum level over a predetermined time period, such as over 30 seconds. In any case, when each security siren receives the siren control signal, each security siren emits an audible alert at the reduced volume level or ramps the audible alert volume level over the predetermined time period.

In yet another example, in addition or alternatively to the examples above, processor 200 may generate one or more siren control signals based, in part, on a location of the security sensor that transmitted the alarm signal. For example, if the security system is operating in an armed-home mode of operation and processor 200 determines that the alarm signal was received from one or more particular sensors, such as tilt sensor 116 in garage 114, it may generate a single siren control signal with instructions that causes each security siren in the security system to emit an audible alert at a maximum volume level, no matter what time of day the alarm signal is received. In another example, processor 200 may generate a first siren control signal when an alarm signal is received from one or more predetermined sensors, such as tilt sensor 116, during a first predetermined time period, such as between 11 PM and 5 AM, with instructions that causes each security siren to emit an audible alert at a maximum volume level, and may generate a second siren control signal when an alarm signal is received from the one or more particular sensors, such as tilt sensor 116, during a second predetermined time period, such as between 5 AM and 11 PM, with instructions that causes each security siren to emit an audible alert at less than a maximum volume level, such as at a soft or medium volume level, or to ramp the volume level from a soft or medium volume level to a maximum volume level over a predetermined time period.

In another related example, if an alarm signal is received from the one or more predetermined sensors by processor 200 during the first predetermined time period, i.e., between 11 PM and 5 AM, processor may generate a first siren control signal with instructions that cause certain security sirens, such as security sirens 108a and 108b, to emit an audible alert at a maximum volume level, and generate a second siren control signal with instructions that causes security siren 108c, near bedroom 112, to emit an audible alert at a volume level that is less than the maximum volume level, for example, at a low or medium volume level, in in order not to startle an occupant that may be sleeping in bedroom 112 (but loud enough to wake an occupant of bedroom 112).

In another related example, processor 200 may generate two or more different siren control signals when an alarm signal is received from one of the security sensors, each of the two or more siren control signals based on a location of the security sensor that provided the alarm signal and a location of two or more security sirens. In general, processor 200 may generate a first siren control signal comprising instructions that causes a security siren located closest to the security sensor that transmitted the alarm signal to sound at a maximum volume, in an attempt to scare away and intruder, while generating a second siren control signal comprising instructions that cause other security sensors located further away from the security sensor that transmitted the alarm signal to emit audible alerts at a volume level at least initially less than a maximum volume level. This embodiment allows for a loud, disruptive siren to sound at or near the location of an attempted break-in, while causing other security sensors located further away to sound at a reduced volume in order to minimize the discomfort otherwise experienced if each security siren is instructed to emit the siren at a maximum volume level.

In one embodiment, processor 200 may determine spatial relationships between security sensors and security sirens by knowing which "zone" each security sensor and security sirens have been assigned during installation. For example, one zone may be labeled "master bedroom" and another zone may be labeled "living room". In this embodiment, when alarm signal is received from a security sensor, processor 200 determines the location of the security sensor that transmitted the alarm signal by determining its zone assigned to it and stored in memory 202. Then, processor 200 may determine which security siren to sound by determining if any security siren has been assigned to the same zone. Upon determining that a security siren is located in the same zone as the security sensor that transmitted the alarm signal, processor 200 may generate a first security siren signal comprising instructions that causes the security sensor located in the same zone to emit an audible alert at a maximum volume level. Additionally, processor 200 may generate a second security siren signal comprising instructions that causes one or more other security sirens in structure 102 emit an audible alert at either a low, moderate, or ramping volume level. In another embodiment, processor 200 may transmit one or more second security siren signals after a brief delay after transmitting the first security siren signal to the siren located in the same zone as the security sensor that transmitted the alarm signal. For example, the first siren control signal may be transmitted to security siren 108c and then, after 30 second delay, transmit one or more second siren control signals to security sirens 108 a and 108B, causing them to emit an audio siren at a low, moderate, or ramping volume level.

In another example, in addition or alternatively to the examples above, processor 200 may generate one or more siren control signals based, in part, how long the security system has been operational. In this embodiment, the siren control signals vary depending on how long the security system has been installed, in order to allow occupants time to get used to the system and avoid false alarms. For example, if the security system is operating in an armed-home mode of operation and processor 200 determines that an alarm signal was received from one of the security sensors, processor 200 may determine a length of time that security system has been installed. When the security system has been installed for less than a predetermined installation time period, such as three months, processor 200 may generate one or more siren control signals that cause one or more security sirens to emit an audible alert at a volume level less than siren's maximum capable volume level, or cause one or more of the security sirens to emit an audible alert in a ramping fashion, i.e., sounding an audible alert at a low or moderate level and increasing to a higher or maximum volume level over a predetermined amount of time, such as 30 seconds. This gives new users of the security system time to disarm the system when a false alarm is triggered while the security system is in the armed-home mode of operation pretty good what's up.

When the security system has been installed for a greater time than the predetermined installation time, processor 200 may generate one or more siren control signals different than the ones generated prior to expiration of the predetermined installation time period. For example, when the security system is operating in the armed-home mode of operation, and processor 200 receives an alarm signal from one of the security sensors, processor 200 may determine a length of time that the security system has been installed by referencing the installation day and/or time stored in memory 202 and compare that to the present date and/or time. When the security system has been installed for a time greater than the predetermined installation time, it may be assumed that occupants of structure 100 are familiar with the operations of the security system and, therefore, there may be less of a need to sound the security sirens at a lower moderate level in order to avoid startling occupants. Thus, when processor 200 determines that the security system has been installed for more than the predetermined installation time, processor 200 generates one or more siren control signals with instructions that cause one or more security sirens to emit an audible alert at a maximum volume level. It should be understood that in some embodiments, more than one predetermined installation time may be defined. For example, a first predetermined installation time may be defined as one month and a second predetermined installation time may be defined as two months, such that siren control signals generated within a first month of installation cause one or more security sirens to initially sound at a low volume level (for example, at a volume level between 60 and 80 decibels), siren control signals generated between the first and second months of installation cause one or more security sirens to initially sound at a moderate volume level (for example, at a volume level between 80 and 100 decibels) while siren control signals generated after the second month of installation cause one or more security sirens to sound at a maximum volume level (for example, between 100 and 120 decibels).

In another example, in addition or alternatively to the examples above, processor 200 may generate one or more siren control signals based, in part, how long the security system has been operational. In this embodiment, the siren control signals vary depending on how long the security system has been installed, in order to allow occupants time to get used to the system and avoid false alarms. For example, if the security system is operating in an armed-home mode of operation and processor 200 determines that an alarm signal was received from one of the security sensors, processor 200 may determine a length of time that security system has been installed. When the security system has been installed for less than a predetermined installation time period, such as three months, processor 200 may generate one or more siren control signals that cause one or more security sirens to emit an audible alert at a volume level less than siren's maximum capable volume level, or cause one or more of the security sirens to emit an audible alert in a ramping fashion, i.e., sounding an audible alert at a low or moderate level and increasing to a higher or maximum volume level over a predetermined amount of time, such as 30 seconds. This gives new users of the security system time to disarm the system when a false alarm is triggered while the security system is in the armed-home mode of operation.

In another example, in addition or alternatively to the examples above, processor 200 may generate one or more siren control signals based, in part, on a determination that one or more authorized occupants are located in one or more areas of structure 100 when the security system is in the armed-home mode of operation and an alarm signal is received from one of the security sensors. The goal, in this embodiment, is not to startle occupants within structure 100 if a false alert occurs. Processor 200 may receive "activity" signals from one or more motion/occupancy sensors 118*a*, 118*b* or 118*c*, indicating either movement or occupancy in an area proximate to the sensors, respectively. The activity signals may be received at various times, and processor 200 may store an indication of the movement or occupancy in memory 202 and associate the motion/occupancy sensor that transmitted the activity signal with a location within structure 100 where the particular motion/occupancy sensor is located. When processor 200 receives an alarm signal from one of the security sensors, it may determine a location where the security sensor is located within structure 100, for example, looking up in memory 202 a zone or a description of a room or area of structure 100 where the security system is located. Processor 200 may also generate one or more siren control signals in response to receipt of the alarm signal in accordance with whether or not authorized persons are within structure 100. For example, if processor 200 determines it received an alarm signal from garage door tilt sensor 116, processor 200 may then determine which security sirens are in proximity to garage door tilt sensor 116 and which security sirens are in proximity to a motion/occupancy sensor that recently transmitted an activity signal, meaning that an authorized person was in proximity to the motion/occupancy sensor within a predetermined time, such as zero and 15 minutes. Processor 200 may then generate a first siren control signal with instructions that causes security siren 108*a*, as a security siren in proximity to the security sensor that transmitted the alarm signal, i.e., garage door tilt sensor 116, to emit and audible alert at a high or maximum volume level, designed to scare away a potential intruder. In addition, processor 200 may also generate a second siren control signal with instructions that causes any security siren that recently transmitted and activity signal to cither refrain from emitting an audible alert or instructions that causes any of these security sirens to emit an audible alert at a low, moderate or ramping volume level, in order to avoid startling such occupants. Processor 200 may, further in addition, generate ⅓ siren control signal with instructions that causes any other security sirens in the security system to emit an audible alert at a maximum volume level, to emit an audible alert at a low, moderate or ramping volume level, or to refrain from emitting an audible alert.

At block 410, in any case, one or more siren control signals are transmitted by processor 200 via first communication interface 204 to one or more security sirens in the security system.

Figure 5:
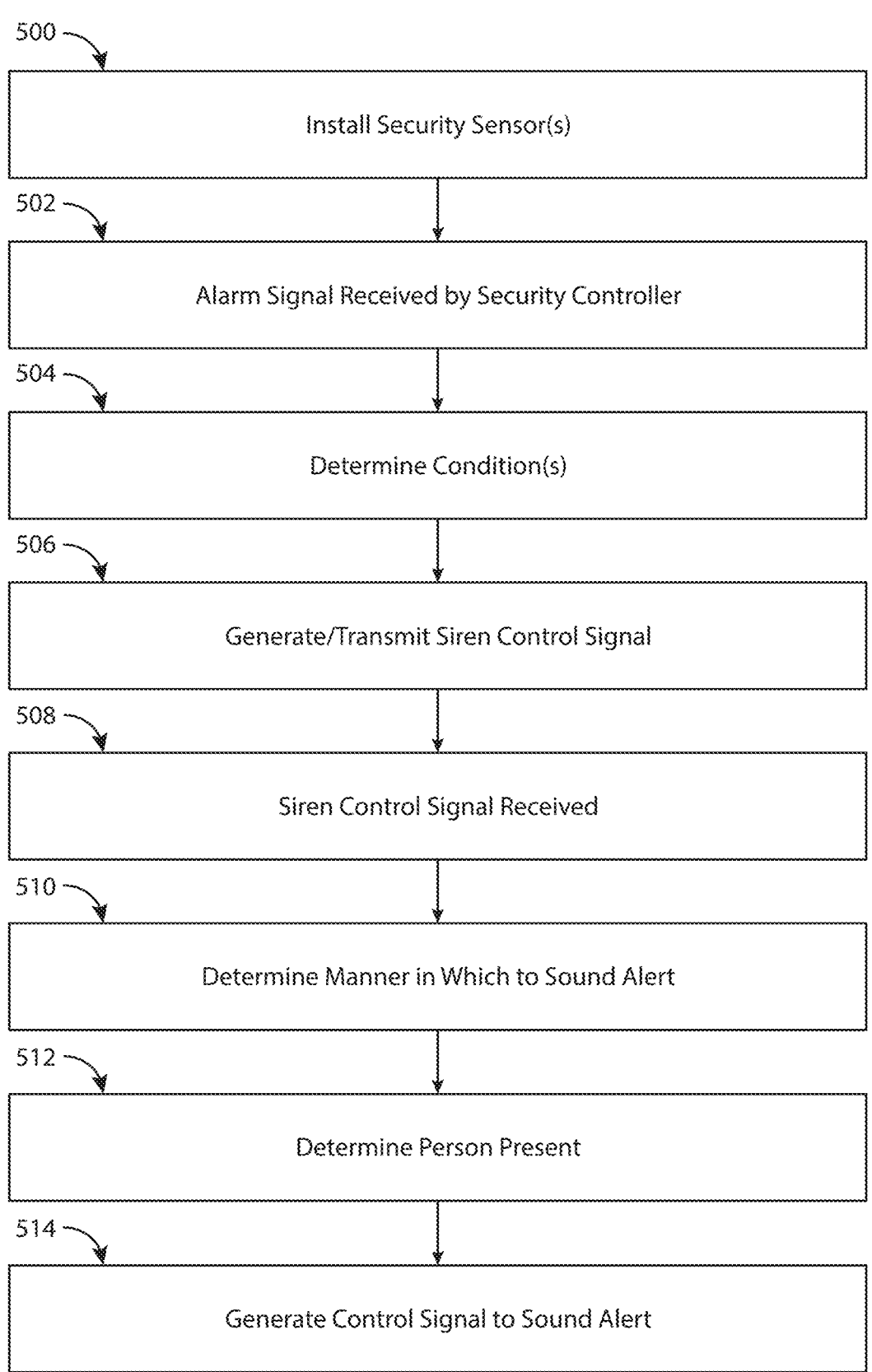
FIG. 5 is a flow diagram illustrating one embodiment of method, or algorithm, performed by one or more of the security sirens in the security system as shown in FIG. 1, for managing audible alerts emitted by the security sirens when an alarm signal is reported by a security sensor within the security system.

FIG. 5 is a flow diagram illustrating one embodiment of method, or algorithm, performed by one or more security sirens in a security system for managing audible alerts emitted by the security sirens when an alarm signal is reported by a security sensor within the security system. It should be understood that in some embodiments, not all of the steps shown in FIG. 5 are performed and that the order in which the steps are carried out may be different in other embodiments. It should be further understood that some minor method steps have been omitted for purposes of clarity.

The process begins at block 500, where one or more security sirens, such as security siren 108*a*, 108*b* or 108C, is installed in structure 100 in association with security system controller 102 and one or more security sensors, as described above. During installation, each security siren is typically enrolled in security system controller 102 using techniques well-known in the art. As part of the enrollment process, and identification of each security siren, as well as a location of each siren, is typically provided to security system controller 102, which stores this information in memory. As part of the installation process, a user may program a security siren with information such as a current date and time, location information of where the security siren is installed inside structure 100, such as assignment of a particular zone or a nomenclature as to where the security sensor is installed (i.e., such as "master bedroom", "dining room", etc.).

At block 502, processor 200 within security system controller 102 may receive an alarm signal from one of the security sensors installed in structure 100 via first communication interface 204 when a door, window or garage tilt sensor is triggered, or when motion is detected by a motion detector installed within structure 100.

At block 504, in response to receiving the alarm signal, processor 200 may determine one or more conditions associated with the security system, such as a location of the security sensor that transmitted the alarm signal, as discussed previously.

At block 506, processor 200 generates a siren control signal and transmits the siren control signal via first communication interface 204 to each of the security sirens of the security system. The siren control signal may comprise one or more conditions associated with the security system, such as an identification of the security sensor that transmitted the alarm signal and/or a location of the security sensor that transmitted the alarm signal. The location may comprise an identification of a zone of the security system where the security sensor that transmitted the alarm signal is located, or a description of a room or other location of structure 100 where the security sensor is located. A time of day when the alarm signal was received may also be transmitted.

At block 508, processor 300 of each security siren of the security system receives the siren control signal via communication interface 304.

At block 510, processor 300 evaluates the siren control signal to determine a manner in which to respond to the siren control signal. For example, the siren control signal may simply comprise an "on" command that causes processor 302 emit a default security siren sound via audio circuitry 306 at a default volume level, such as a maximum volume level able to be produced by a security siren.

In another example, processor 300 may determine, from the siren control signal, that the particular security siren is not located near the security sensor that transmitted the alarm signal. Processor 300 may determine this by comparing the location of the security alarm to the location of the security siren as stored in memory 302. If processor 300 determines that the security siren is located near the location of the security sensor that transmitted the alarm signal, processor 300 may cause audio circuitry 306 to emit a security siren at a loud or maximum volume level. If processor 300 determines that the security siren is not located near the location of the security sensor, then processor 300 may cause an audible security siren to be emitted by audio circuitry 306 at a relatively low, moderate or ramping fashion, or to emit no siren at all, in order not to startle any authorized occupants of structure 100 near the security siren. In another embodiment, processor 300 may cause one of a plurality of different siren types to be emitted if the location of the security siren is near the location of the security sensor that transmitted the alarm signal. For example, processor 300 could cause machine-generated voice to alert occupants that the security system was triggered at low, medium, high or in a ramping volume level. Selection of which type of security siren to sound may be pre-programmed by an authorized user of security system and stored in memory 302.

At block 512, processor 300 may receive information from person detector 308, indicating the presence of an authorized person within structure 100 in proximity to the security siren. When processor 300 receives a siren control signal, in addition or alternatively to the responses described above, processor 300 may generate a control signal that causes audio circuitry 306 to emit an audible alert, or no siren at all, at a low, medium, high, maximum or ramping volume level, in accordance with one or more audible alert types, depending on whether a person is in proximity to the security siren. For example, if a security siren receives information from person detector 308 that a person is in proximity to the security siren, processor 300 may store this information in memory 302 along with a time that the person was detected. When processor 300 receives the siren control signal, it may check memory 302 to determine if a person has been in proximity to the security siren within a predetermined time period, such as between zero and 15 minutes, for example. If a person was detected to be within proximity of the security sensor within the predetermined time period, processor 300 generates a control signal that causes audio circuitry 306 to emit an audible alert at an audio level less than a maximum audio level capable of being produced by the security sensor. The type of security siren and its volume level may be stored within memory 302 during a provisioning process upon installation of the security siren. Alternatively, if no person has been detected in proximity to the security siren within the predetermined time period, processor 300 may cause audio circuitry 3062 emit a security siren at a loud or maximum volume level, in some embodiments, in accordance with pre-programmed instructions stored in memory 302 during the provisioning process.

In any case, at block 514, processor 300 provides a control signal to audio circuitry 306 that causes audio circuitry 306 to emit an audible security siren of a particular siren type and/or a particular audio volume level.

Therefore, having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A security system controller of a security system having a security siren, comprising:
   a communication interface;
   a non-transitory memory for storing processor-executable instructions; and
   a processor, coupled to the first communication interface and the non-transitory memory, for executing the processor-executable instructions that causes the processor to:
   receive, via the communication interface, an alarm signal from a security sensor;
   respond to receiving the alarm signal by generating a one of a first siren control signal that causes the security siren to sound an alarm at a first volume level and a second siren control signal that causes the security siren to sound an alarm at a second volume level louder than the first volume level based on one or more conditions related to the security system; and
   transmit, via the communication interface, the one of the first siren control signal and the second siren control signal to the security siren;
   wherein the one or more conditions comprise an elapsed time after the security system was installed.

2. The security system controller of claim 1, wherein the first siren control signal further causes the security siren to gradually increase the first volume level over time.

3. The security system controller of claim 1, wherein the first siren control signal further causes the security siren to sound an alarm at the second volume level upon the expiration of a predetermined amount of time.

4. A method, performed by a security system controller of a security system having a security siren, comprising:

receiving an alarm signal from a security sensor of the security system;

responding to receiving the alarm signal by generating a one of a first siren control signal that causes the security siren to sound an alarm at a first volume level and a second siren control signal that causes the security siren to sound an alarm at a second volume level louder than the first volume level based on one or more conditions related to the security system; and transmitting the one of the first siren control signal and the second siren control signal to the security siren;

wherein the one or more conditions comprise an elapsed time after the security system was installed.

5. The method of claim 4, wherein the first siren control signal causes the security siren to gradually increase the first volume level over time.

6. The method of claim 4, wherein the first siren control signal causes the security siren to sound an alarm at the second volume after a predetermined amount of time.

\*　\*　\*　\*　\*